(12) United States Patent
Northcutt

(10) Patent No.: US 7,275,752 B2
(45) Date of Patent: Oct. 2, 2007

(54) BODDY DOLLIE

(76) Inventor: James Donald Northcutt, 313 S. Church St., Cynthiana, KY (US) 41031

( * ) Notice: Subject to any disclaimer, the term of this patent is extended or adjusted under 35 U.S.C. 154(b) by 88 days.

(21) Appl. No.: 10/896,137

(22) Filed: Nov. 13, 2004

(65) Prior Publication Data

US 2006/0103091 A1 May 18, 2006

(51) Int. Cl.
*B62B 3/04* (2006.01)
(52) U.S. Cl. .................... 280/79.11; 280/47.35; 280/79.7
(58) Field of Classification Search ............. 280/79.11, 280/47.35, 79.7
See application file for complete search history.

(56) References Cited

U.S. PATENT DOCUMENTS

| | | | | |
|---|---|---|---|---|
| 3,288,483 A | * | 11/1966 | Pittenger | 280/79.11 |
| 4,166,638 A | * | 9/1979 | De Prado | 280/638 |
| D253,465 S | * | 11/1979 | Lobdell | D34/23 |
| 4,178,006 A | * | 12/1979 | Johnson | 280/79.11 |
| 5,863,056 A | * | 1/1999 | Hostetter | 280/47.371 |
| 6,736,437 B2 | * | 5/2004 | Freeland | 294/152 |
| 6,974,140 B2 | * | 12/2005 | Neuman | 280/79.11 |

* cited by examiner

*Primary Examiner*—Christopher P. Ellis
*Assistant Examiner*—John D Walters
(74) *Attorney, Agent, or Firm*—Alexander P. Brackett; Middleton Reutlinger

(57) ABSTRACT

The improved moving dolly system is provided having a pair of opposing carts along a bottom surface of an article of furniture in order to move the article. Each cart receives opposing bottom edges of the article. A strap is used in conjunction with each cart allowing two operators to guide and/or lift the article during transportation. The moving dolly system allows for articles to be rolled or lifted above obstacles, easily maneuvered, and reduces injuries related to poor lifting/carrying posture.

10 Claims, 7 Drawing Sheets

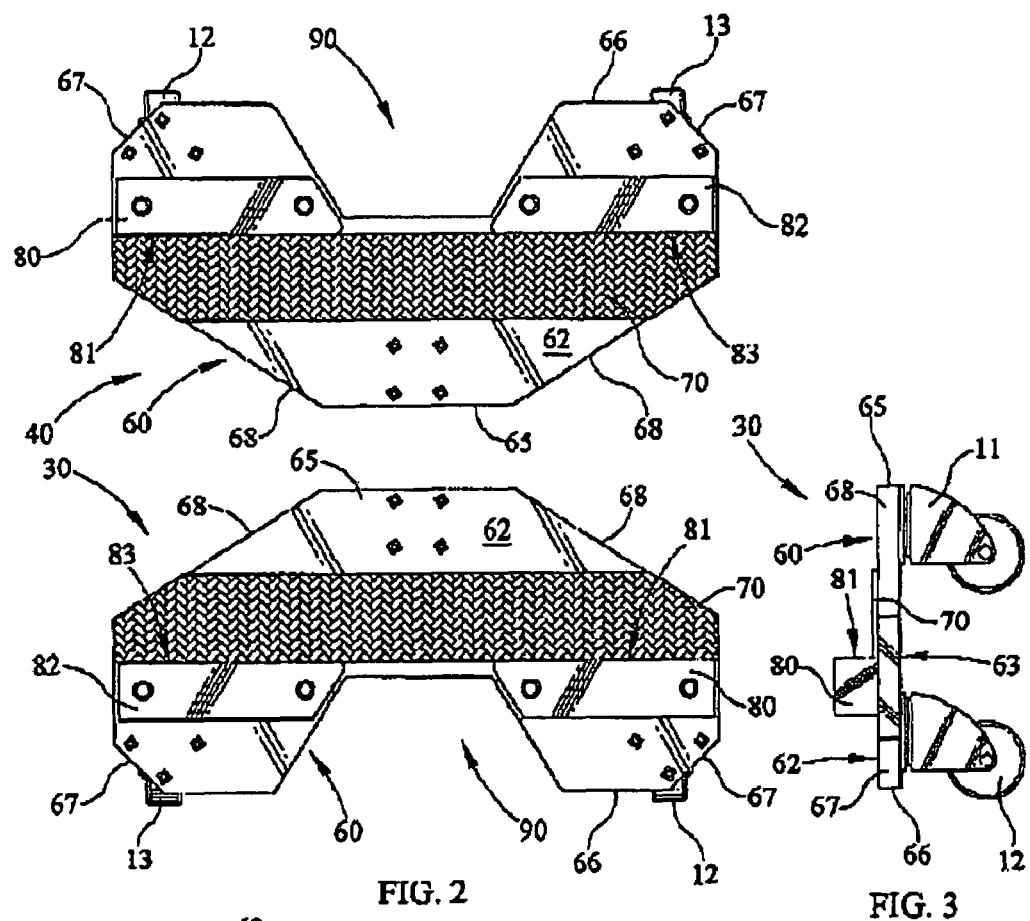
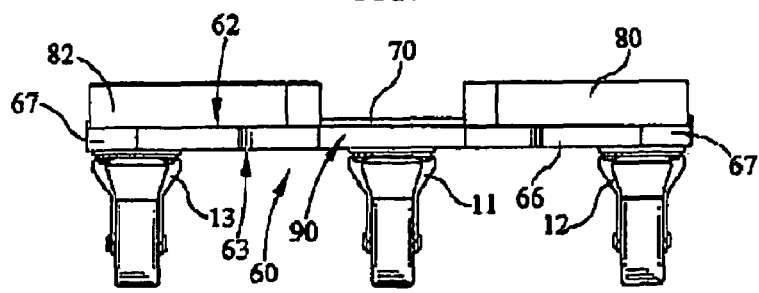

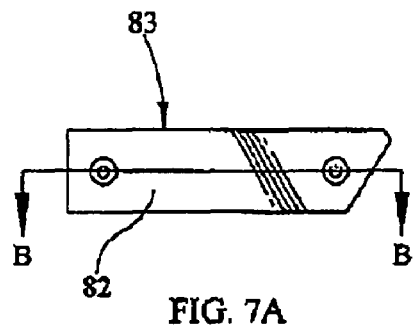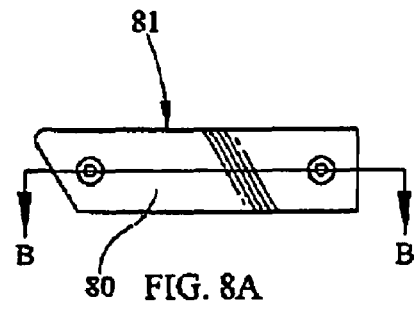
FIG. 7A　　FIG. 8A
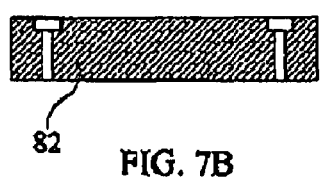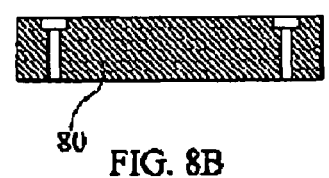
FIG. 7B　　FIG. 8B
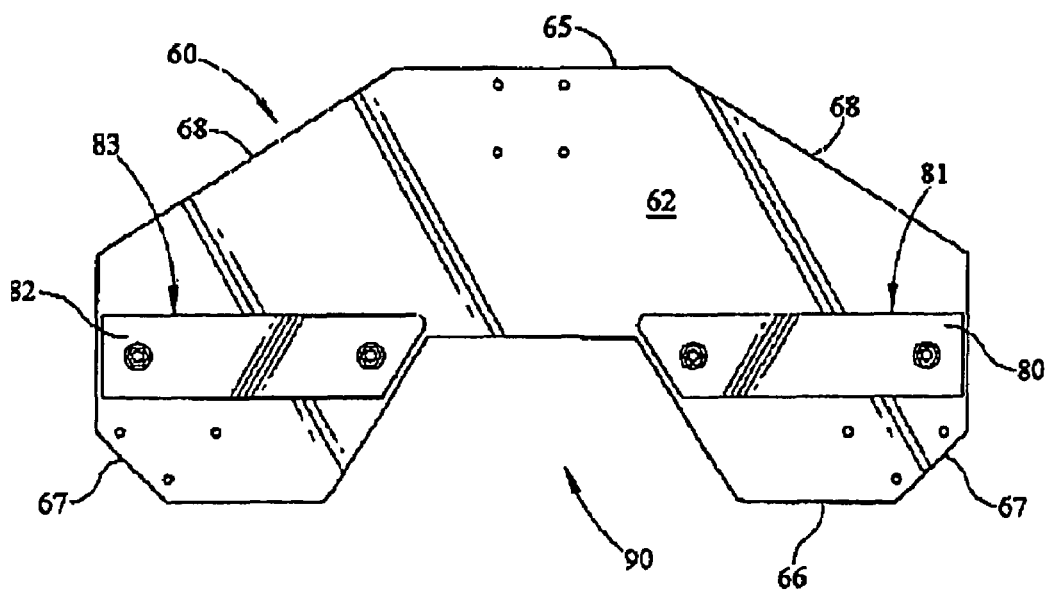
FIG. 9

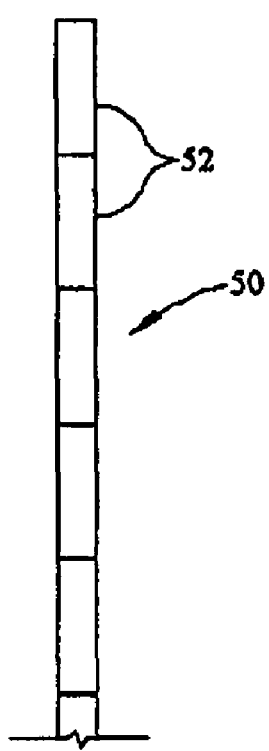
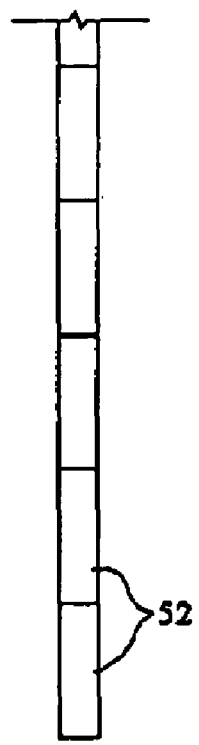
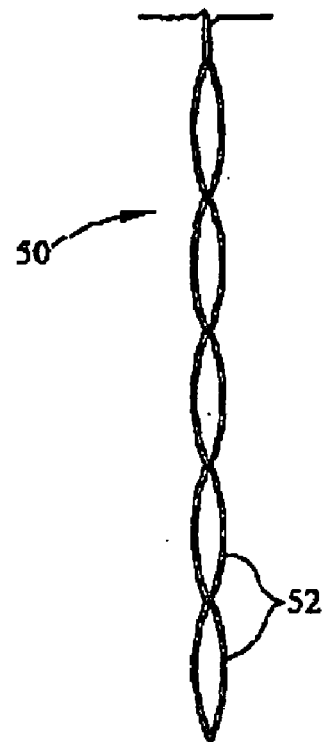
FIG. 14A  FIG. 14B

US 7,275,752 B2

BODDY DOLLIE

TECHNICAL FIELD

The present invention relates to a furniture moving dolly and particularly to a two person moving dolly system with a strap.

BRIEF DESCRIPTION OF THE DRAWINGS

FIG. 2 is a top view of a pair of opposing moving dolly carts;

FIG. 3 is a side view of a moving dolly cart of FIG. 2;

FIG. 4 is a rear view of the moving dolly cart of FIG. 3;

FIG. 7A is a top view of the right backrest of the moving dolly cart of FIG. 3;

FIG. 7B is a sectional view of the right backrest of FIG. 7A taken along line B-B;

FIG. 8A is a top view of the left backrest of the moving dolly cart of FIG. 3;

FIG. 8B is a sectional view of the left backrest of FIG. 8A taken along line B-B;

FIG. 9 is a top view of the right backrest (FIG. 7A) and left backrest (FIG. 8A) fastened to the top surface of the platform of FIG. 5;

FIG. 14A is a top view of the strap of FIG. 1;

FIG. 14B is a side view of the strap of FIG. 14A.

DETAILED DESCRIPTION

As shown in the FIGS. 1A-14B, one embodiment of a moving dolly system 20 is provided having a pair of opposed carts 30, 40 with a lifting or guiding strap 50 which facilitates the moving of furniture, appliances, or similar articles of manufacture. Moving dolly system 20 is designed to facilitate the moving and lifting of heavy objects and maneuvering them about obstacles and narrow turns.

Figure 1A:
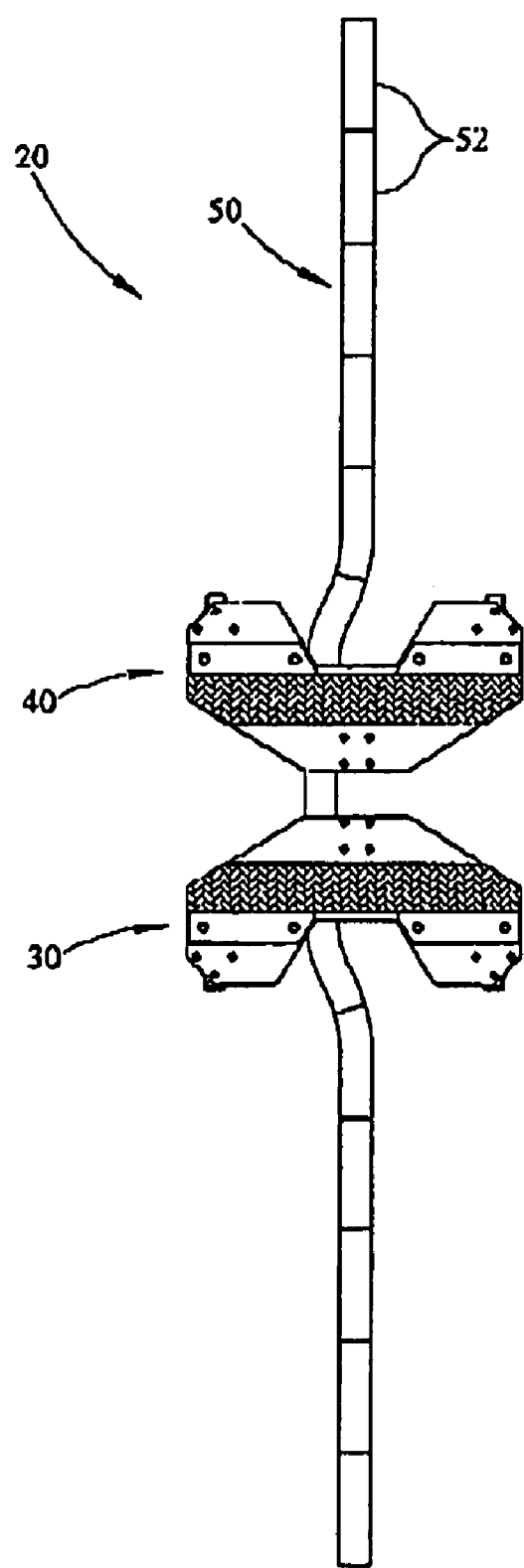
FIG. 1A is a top view of the moving dolly system according to one embodiment.
Figure 1B:
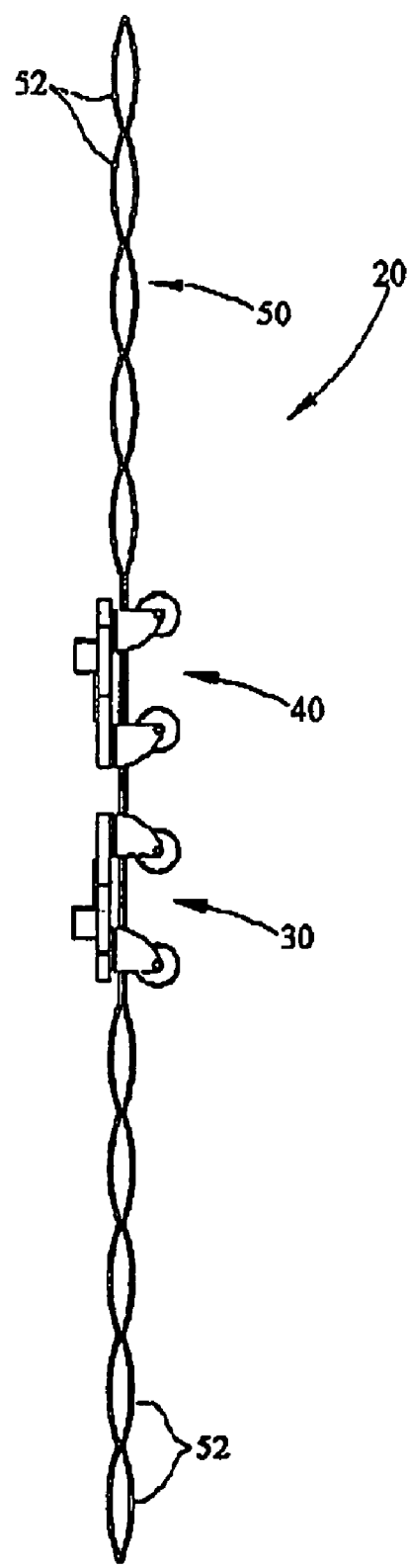
FIG. 1B is a side view of the moving dolly system of FIG. 1A.

As illustrated in FIGS. 1A, 1B, moving dolly system 20 may include a first cart 30 and a second cart 40 with a strap 50 positioned beneath each of first and second carts. First cart 30 and second cart 40 are opposed to serve as a ledge to place the article thereon. First cart 30 is positioned and engages a forward edge of a piece of furniture (not shown) or load, while a substantially identical cart 40 is positioned and engages a rear edge of the same load, with second cart being reversed 180 degrees in orientation for receiving the rear edge of the load. Strap 50 is placed under carts 30, 40 with the received piece of furniture and used to guide and lift the article during the moving process.

Figure 5:
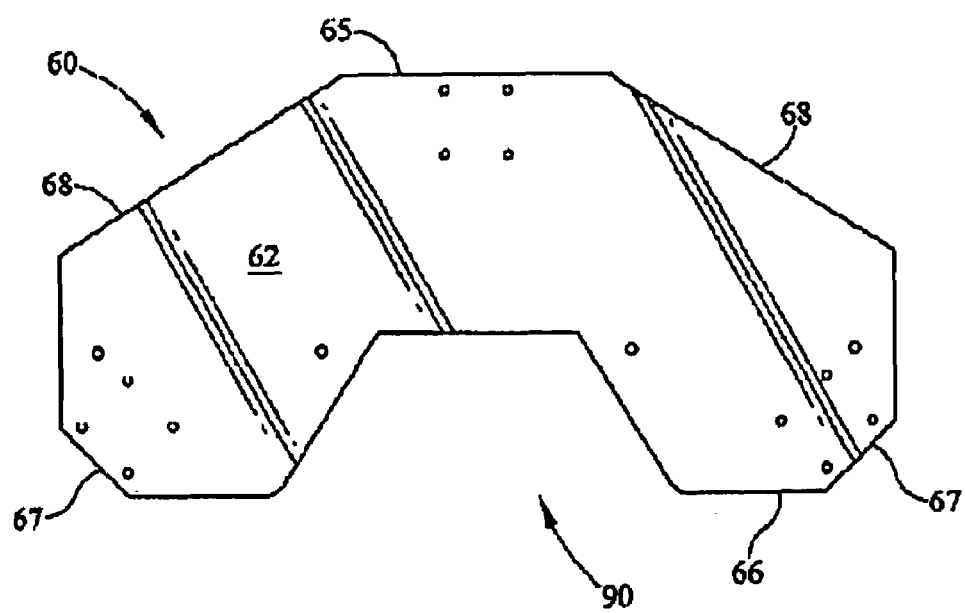
FIG. 5 is a top view of the platform of the moving dolly cart of FIG. 3.
Figure 6:
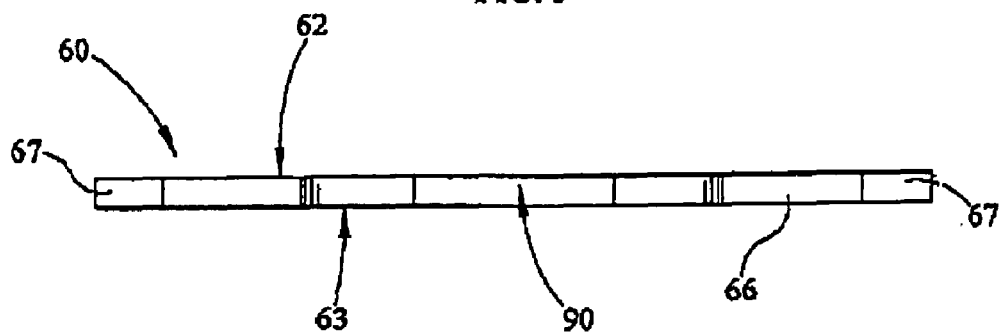
FIG. 6 is a rear view of the platform of FIG. 5.
Figures 10A, 10B:
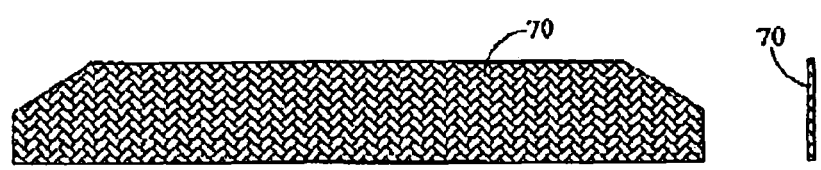
FIG. 10A is a top view of the non-skid pad.
FIG. 10B is a side view of the non-skid pad of FIG. 10A.
Figure 11:
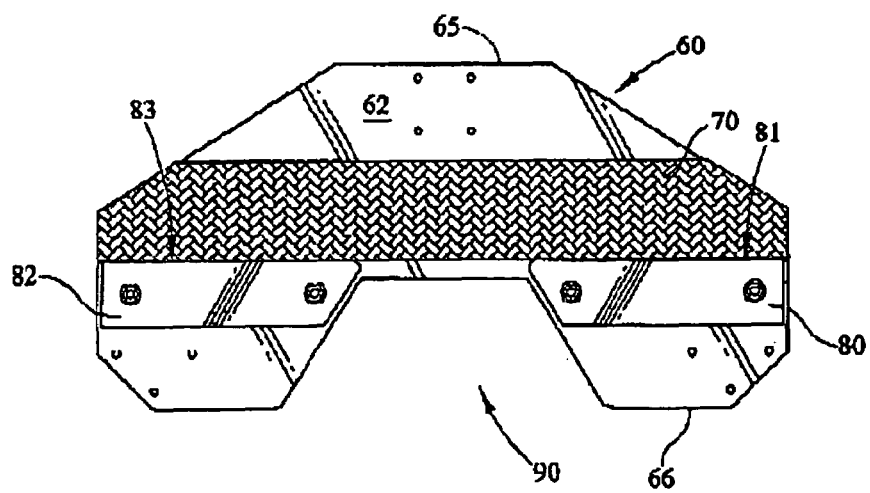
FIG. 11 is a top view of the platform and backrests of FIG 9 with the non-skid pad of FIG. 10A.

As shown in FIGS. 1A-6, 9, and 11-13, each of first cart 30 and second cart 40 has a lateral platform 60 having a top surface 62 for receiving the article (not shown). Top surface 62 of the carts 30, 40 may have a pad or non-skid pad 70 located parallel with a front end 65 of the platform. Non-skid pad 70 abuts a pair of braces or backrests 80, 82. A left backrest 80 (FIGS. 8A and 8B) and a right backrest 82 (FIGS. 7A and 7B) extend perpendicular to top surface 62 of platform 60 a sufficient distance for bracing the edge of a piece of furniture resting upon platform 60. Each respective backrest 80, 82 maintains a contact surface 81, 83 which the furniture edge (not shown) braces against. Left backrest 80 is separated from right backrest 82 by a notch 90 removed from a back end 66 of platform 60. Notch 90 aids in the alignment of strap 50 once the strap is placed taut against a bottom surface 63 of platform 60 upon moving the furniture. Notch 90 may terminate adjacent contact surfaces 81, 83 of left backrest 80 and right backrest 82. Platform 60 as best seen in FIGS. 5 and 6 may also contain a series of broken corners or chamfered edges. Chamfered edges 67, along back end 66 of platform 60, allows for each cart 30, 40 to make narrower turns, unlike 90 degree corners which may extend out and come in contact with walls upon turning dolly system 20. Chamfered edges 68, along front end 65 of platform 60, allow for each cart to be more readily placed under the furniture and also minimize the likelihood of front end 65 from catching an edge on obstacles that are encountered while moving the article. Platform 60 may be generally triangular in shape after the corners have been chamfered.

As shown in FIG. 9, platform 60 and backrests 80, 82 may be made from wood, plastic, metals or any other materials known in the art and still fall within the scope of the invention. Furniture is placed upon a portion of non-skid pad 70 to minimize the slipping of the furniture upon the cart. Pad 70 seen in FIGS. 10A and 10B may also protect the contacted surfaces of the furniture. Pad 70 is typically made from, but is not limited to, SBR-Friction surface belting. Non-skid pad 70 may be attached to top surface 62 of platform 60 by staples, screws, or any other fastening means known in the art. The combination of the backrests 80, 82 and non-skid pad 70 placed on platform 60 minimizes the slippage of the articles as they are moved or lifted.

Figure 12:
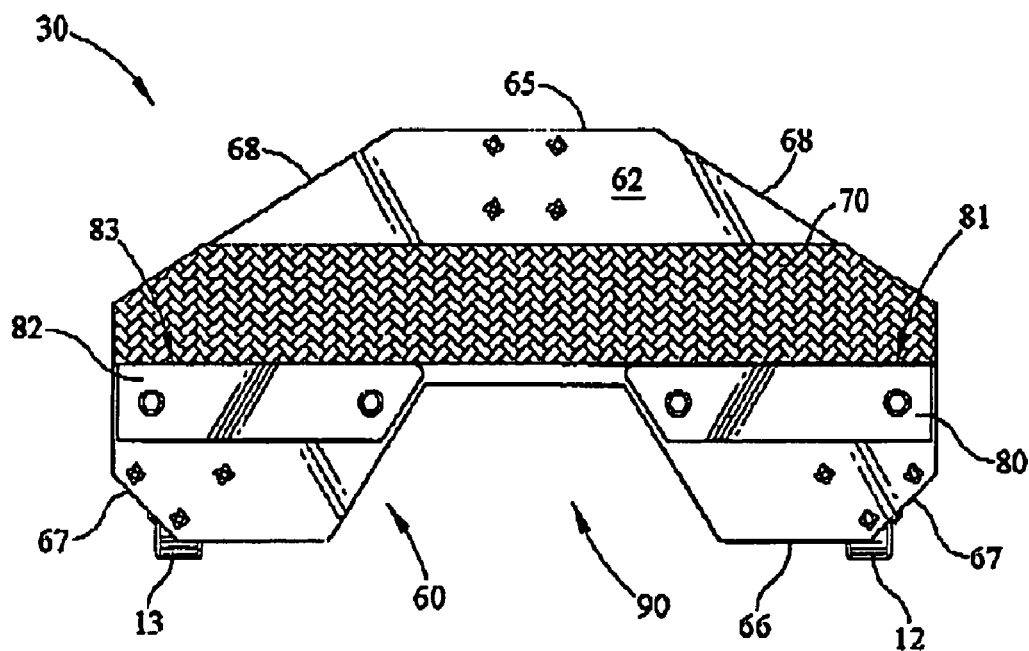
FIG. 12 is a top view of the moving dolly cart of FIG. 3.
Figure 13:
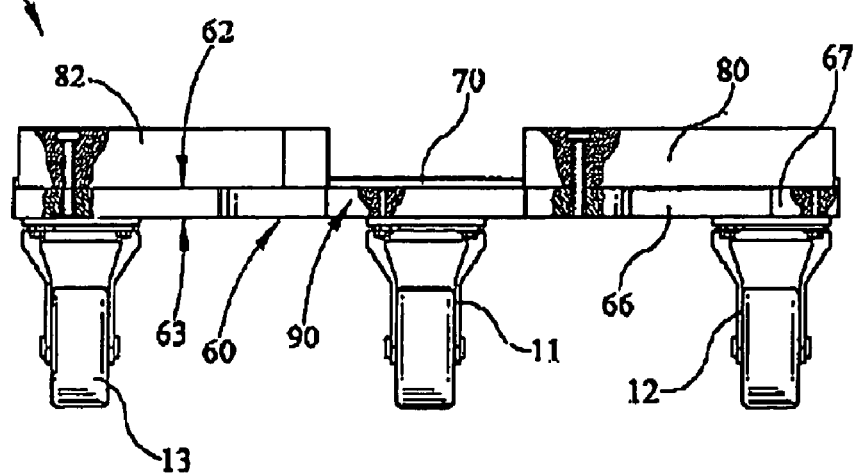
FIG. 13 is a rear, partial sectional view of the moving dolly cart of FIG. 3 with the fastening arrangement partially shown.

As shown in FIGS. 1A, 2, 4, 12, and 13, platform 60 of each cart 30, 40 is supported upon three, equal sized, swivel casters mounted on bottom surface 63 of the platform. A first caster 11 is located in an adjacent and substantially centered location relative to front end 65 of platform 60. A second caster 12 and a third caster 13 are located in each corner of back end 66 of platform 60. Second caster 12 and third caster 13 are on opposite sides of notch 90 of platform 60. As shown in FIGS. 1A, 2, and 12, casters 11, 12, 13 are symmetrically located about bottom surface 63 of platform 60, creating a substantially triangular orientation of the casters. The first 11, second 12, and third 13 casters maintain platform 60 in its horizontal plane to receive an item of furniture upon top surface 62 of the platform and branched against each relative contact surfaces 81, 83 of backrests 80, 82. All casters 11, 12, 13 may be the same diameter, for example three inch diameter, bearing type casters. The larger diameter of casters facilitates negotiation over uneven surfaces. Also, cart 30 as best seen in FIGS. 12 and 13 illustrates the fastening arrangement between the caster 11, 12, 13, backrests 80, 82, and platform 60.

Strap 50, as shown in FIGS. 1A, 1B, 14A, and 14B, is formed with hand and wrist loops 52 located at each end thereof. Loops 52 are used to guide and lift furniture or other heavy articles. Strap 50 is typically made from, but is not limited to, nylon to provide the functionality and durability required by the nature of its use. Strap 50 may have a plurality of hand or wrist loops 52 or handles located at proximate terminating end of the strap. Each loop 52 may be about seven inches in diameter to loop around the wrist, and may be formed by looping strap back upon itself and using a heavy stitch line between each loop. The overall length of the guide strap 50, inclusive of loops 52, may be about 144 inches.

During normal usage moving dolly system 20 during normal usage is capable of moving and lifting heavy articles and maneuvering them about obstacles and narrow turns. Once the article of manufacture to be moved is tipped onto one edge, the user will push first cart 30 under the article to the point where the stop edge or backrests 80, 82 abut the side of the article and rests upon pad 70. The article to be moved is subsequently tipped up upon the edge previously placed onto first cart 30. While tipped up, the user will push second cart 40 under the raised edge of the article to the point where the stop edge or backrests 80, 82 abut the side of the article and the bottom surface of the article rests upon pad 70. Both carts 30, 40 may be pushed or rolled under the article conveniently by the user's foot, preventing the user from bending over. Strap 50 may be placed onto the ground next to the two carts 30, 40 now holding the article. The user may then roll the article over the strap and draw out the slack. Strap 50 may also be snaked by hand underneath the carts. As shown in FIGS. 1A and 1B, strap 50 is positioned from back end 66 of each cart 30, 40 between second caster 12 and third caster 13 and passed along each relative first caster 11 under the article being moved. Strap 50 passes up through each notch 90 of the carts 30, 40, wherein the notch maintains the strap in a substantially centered location relative to the carts and the article, which may also be substantially centered upon the carts. As a person on both ends of strap 50 tightens the strap, the article will be drawn up tight against each respective backrest 80, 82 of carts 30, 40 creating one interconnected maneuverable load. The load is now easy to roll, turn, twist, lift and guide, even through tight spaces or around corners. The user on each end of strap 50 may place his/her wrist or haul in loop 52 and the other hand vertically on the article in order to balance the load during horizontal movement or vertical movement. Once the article is in close proximity to its final destination, the user may reverse the procedure for moving the article as described above to place the article in its new location.

Another benefit of moving dolly system 20 is the maneuverability of the article and the minimized adverse effects upon the users. The system allows users to transition from rolling the article immediately to carrying the article in order to maneuver about obstacles such as steps, uneven grades, or ramps. The system may also minimize injuries, such as back strains, due to improper lifting. Strap 50 minimizes the user from bending over to grasp the bottom of the article in order to lift. By using moving dolly system 20, the user may place his hand into the desired loop 52 and lock the arm to lift and carry the article. Thus, the user need only use the desired loop 52 and raise the article to the necessary level of clearance of an obstacle by using the arms, thereby minimizing the stress to the back. By using the moving dolly system 20, the center of gravity of the article may be maintained closer to the ground which minimizes the dangers of the article falling a substantial distance. Injuries to the user caused by a sudden fall of the article from an unnecessary height are also minimized. Injurious bending to return the article to the ground is also reduced. Moving dolly system 20 is capable of use with articles of furniture with or without legs and articles of various dimensions. The system also may be rolled in all directions due to the casters and straps to guide the one maneuverable piece.

It is understood that while certain embodiments of the invention have been illustrated and described, it is not limited thereto except insofar as such limitations are included in the following claims and allowable functional equivalents thereof.

The invention claimed is:

1. A moving dolly system for moving a load comprising:
   a first and second opposed carts;
   said first cart and said second cart each having a platform having a top surface, a bottom surface, a front end, and a back end, the top surface having a first backrest and a second backrest extending upwardly generally perpendicular therefrom, the back end of the platform having a notch therein, a first caster depending from the bottom surface of the platform adjacent the front end of the platform, a second caster and a third caster depending from the bottom surface adjacent the back end, the second caster and the third caster are on opposed sides of the notch, the top surface of the platform has a pad;
   a strap unattached to each said first cart and said second cart having a first free end and a second free end, the first free end of said strap engaging the notch of said first cart and passing adjacent the bottom surface of said first cart, the second free end of said strap engaging the notch of said second cart and passing adjacent the bottom surface of said second cart whereby a force exerted on the first and second free ends of said strap secures said first and second carts adjacent said load; and whereby
   said first cart and said second cart are spaced at variable distances by said strap, said strap permitting the lifting of said load and maneuvering by a pair of users, one user at each of said first free end and said second free end of said strap.

2. The moving dolly system of claim 1 wherein the platform of each said first cart and said second cart is substantially triangular in shape.

3. The moving dolly system of claim 1 wherein said strap has a plurality of loops located at the first free end and second free end thereof.

4. The moving dolly system of claim 1 wherein the notch of the platform extends between the first backrest and the second backrest of said first cart and second carts.

5. The moving dolly system of claim 1 wherein the platform of said first cart and second carts has a plurality of chamfered edges.

6. A moving dolly system capable of moving an article of manufacture having a bottom surface with a front edge and a rear edge comprising:
   a first cart having a platform having a top surface, a bottom surface, a front end, and a back end, the top surface having a first backrest and a second backrest extending upwardly generally perpendicular therefrom, the back end of the platform having a notch therein, a first caster depending from the bottom surface of the platform adjacent the front end of the platform, a second caster and a third caster depending from the bottom surface adjacent the back end, the second caster and the third caster are on opposed sides of the notch, the top surface of the platform has a pad, the pad and the first backrest and the second backrest engaging the front edge of the article of manufacture;
   a second cart having a platform having a top surface, a bottom surface, a front end, and a back end, the top surface having a first backrest and a second backrest extending upwardly generally perpendicular therefrom, the back end of the platform having a notch therein, a first caster depending from the bottom surface of the platform adjacent the front end of the platform, a second caster and a third caster depending form the bottom surface adjacent the back end, the second caster and the third caster are on opposed sides of the notch, the top surface of the platform has a pad, the pad and the first backrest and the second backrest engaging the rear edge of the article of manufacture;

said first cart is opposed to said second cart;

a strap unattached to each said first cart and said second cart having a first free end and a second free end, the first free end of said strap engaging the notch of said first cart and passing adjacent the bottom surface of said first cart, the second free end of said strap engaging the notch of said second cart and passing adjacent the bottom surface of said second cart whereby a force exerted on the first and second free ends of said strap secures said first cart adjacent the front edge of the article of manufacture and said second cart adjacent the rear edge of the article of manufacture; and whereby said first cart and said second cart are spaced at variable distances by said strap, said strap permitting the lifting of the article of manufacture and maneuvering by a pair of users, one user at each of said first free end and said second free end of said strap.

7. The moving dolly system of claim 6 wherein the platform of each said first cart and said second cart is substantially triangular in shape.

8. The moving dolly system of claim 6 wherein said strap has a plurality of loops located at the first free end and second free end thereof.

9. The moving dolly system of claim 6 wherein the notch of the platform extends between the first backrest and the second backrest of each said first cart and second cart.

10. The moving dolly system of claim 6 wherein the platform of each said first cart and said second cart has a plurality of chamfered edges.

* * * * *